United States Patent
Chheda et al.

(10) Patent No.: US 6,704,370 B1
(45) Date of Patent: Mar. 9, 2004

(54) INTERLEAVING METHODOLOGY AND APPARATUS FOR CDMA

(75) Inventors: Ashvin Chheda, Dallas, TX (US); David W. Paranchych, Richardson, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/290,816

(22) Filed: Apr. 13, 1999

Related U.S. Application Data (60) Provisional application No. 60/103,770, filed on Oct. 9, 1998.

(51) Int. Cl.$^7$ ................................................ H04L 27/04
(52) U.S. Cl. ..................................................... 375/299
(58) Field of Search ................................. 375/299, 377, 375/349, 347, 367, 341, 130; 370/441, 442, 479; 714/786, 794

(56) References Cited

U.S. PATENT DOCUMENTS

| | | | | |
|---|---|---|---|---|
| 5,583,500 A | * | 12/1996 | Allen et al. ................... | 341/107 |
| 5,838,733 A | * | 11/1998 | Bruckert ...................... | 375/297 |
| 6,055,277 A | * | 4/2000 | Stephens et al. ............. | 375/285 |
| 6,064,663 A | * | 5/2000 | Honkasalo et al. .......... | 370/335 |
| 6,128,330 A | * | 10/2000 | Schilling ..................... | 375/141 |
| 6,173,005 B1 | * | 1/2001 | Kotzin et al. ................ | 375/141 |
| 6,304,581 B1 | * | 10/2001 | Chen et al. ................... | 370/479 |

FOREIGN PATENT DOCUMENTS

| | | |
|---|---|---|
| DE | 42 19 677 A1 | 2/1993 |
| EP | 674 455 A1 | 9/1995 |

OTHER PUBLICATIONS

K. Ban, et al., "Convolutionally Coded DS/CDMA System Using Multi–Antenna Transmission"; Global Telecommunications Conference 1997, pp. 92–96.

Rappaport, T.S., "Wireless Communications, Principles & Practice," *Fundamentals of Channel Coding*, pp. 338–339; Prentice Hall (Sep. 1995).

Viterbi, A.J., "CDMA, Principles of Spread spectrum Communication," *Addison–Wesley Wireless Communications Series*, pp. 123–126.

"Mobile Station–Base Station Compatibility Standard for Dual–Mode Wideband Spread Spectrum Cellular System," *Telecommunications Systems Bulletin: Support for 14.4 kbps Data Rate and PCS Interaction for Wideband Spread Spectrum Cellular Systems*, pp. 6–16—6–19, 7–9—7–13 (Feb. 27, 1996).

Chheda, A. et al., Telecommunications Industry Association, "Improved Implementation of Orthogonal Transmit Diversity under Correlated Fading Conditions," San Diego (Jan. 11, 1999).

(List continued on next page.)

*Primary Examiner*—Khai Tran
(74) *Attorney, Agent, or Firm*—Carr LLP (57) ABSTRACT

Disclosed is an encoder, interleaver and splitter design approach for increasing system capacity. This is accomplished in a dual path embodiment by splitting the data stream into two subsets where one subset contains even number position bits of the original set and the other subset comprises the remaining odd bits. Each of the subsets may then be interleaved in standard fashion. This approach ensures that consecutively occurring bits in the original set are never transmitted from the same antenna and can be used to maximize the distance (and accordingly the time of transmission) between alternately occurring bits. The thought process behind this embodiment of the invention may be used to design a single interleaver as practiced in the prior art to accomplish the equivalent end result. The design process may be modified to include any number of transmission paths.

Additional improvement of capacity may be obtained where each subset is interleaved in a manner to maximize the time separation between transmission of data bits, originally occurring L bits apart, prior to splitting or interleaving, in each of L data paths.

16 Claims, 6 Drawing Sheets

OTHER PUBLICATIONS

Ling, F. et al., Telecommunications Industry Association, "OTD and MC DEMUX Recommendations," Wailea, Maui, HI (Dec. 10, 1998).

Jalloul, L. et al., Telecommunications Industry Association, "Interleaving for Transmit Diversity in Direct Spread and Multi–Carrier," Tucson, AZ (Feb. 15–19, 1999).

* cited by examiner

| a | 1  | 25 | b | 49 | 73 | 97  | 121 | 145 | 169 | 193 | 217 | 241 | 265 | 289 | 313 | 337 | 361 |
|---|----|----|---|----|----|-----|-----|-----|-----|-----|-----|-----|-----|-----|-----|-----|-----|
| a | 2  | 26 |   | 50 | 74 | 98  | 122 | 146 | 170 | 194 | 218 | 242 | 266 | 290 | 314 | 338 | 362 |
|   | 3  | 27 |   | 51 | 75 | 99  | 123 | 147 | 171 | 195 | 219 | 243 | 267 | 291 | 315 | 339 | 363 |
|   | 4  | 28 |   | 52 | 76 | 100 | 124 | 148 | 172 | 196 | 220 | 244 | 268 | 292 | 316 | 340 | 364 |
|   | 5  | 29 |   | 53 | 77 | 101 | 125 | 149 | 173 | 197 | 221 | 245 | 269 | 293 | 317 | 341 | 365 |
|   | 6  | 30 |   | 54 | 78 | 102 | 126 | 150 | 174 | 198 | 222 | 246 | 270 | 294 | 318 | 342 | 366 |
|   | 7  | 31 |   | 55 | 79 | 103 | 127 | 151 | 175 | 199 | 223 | 247 | 271 | 295 | 319 | 343 | 367 |
|   | 8  | 32 |   | 56 | 80 | 104 | 128 | 152 | 176 | 200 | 224 | 248 | 272 | 296 | 320 | 344 | 368 |
|   | 9  | 33 |   | 57 | 81 | 105 | 129 | 153 | 177 | 201 | 225 | 249 | 273 | 297 | 321 | 345 | 369 |
|   | 10 | 34 |   | 58 | 82 | 106 | 130 | 154 | 178 | 202 | 226 | 250 | 274 | 298 | 322 | 346 | 370 |
|   | 11 | 35 |   | 59 | 83 | 107 | 131 | 155 | 179 | 203 | 227 | 251 | 275 | 299 | 323 | 347 | 371 |
|   | 12 | 36 |   | 60 | 84 | 108 | 132 | 156 | 180 | 204 | 228 | 252 | 276 | 300 | 324 | 348 | 372 |
|   | 13 | 37 |   | 61 | 85 | 109 | 133 | 157 | 181 | 205 | 229 | 253 | 277 | 301 | 325 | 349 | 373 |
|   | 14 | 38 |   | 62 | 86 | 110 | 134 | 158 | 182 | 206 | 230 | 254 | 278 | 302 | 326 | 350 | 374 |
|   | 15 | 39 |   | 63 | 87 | 111 | 135 | 159 | 183 | 207 | 231 | 255 | 279 | 303 | 327 | 351 | 375 |
|   | 16 | 40 |   | 64 | 88 | 112 | 136 | 160 | 184 | 208 | 232 | 256 | 280 | 304 | 328 | 352 | 376 |
|   | 17 | 41 |   | 65 | 89 | 113 | 137 | 161 | 185 | 209 | 233 | 257 | 281 | 305 | 329 | 353 | 377 |
|   | 18 | 42 |   | 66 | 90 | 114 | 138 | 162 | 186 | 210 | 234 | 258 | 282 | 306 | 330 | 354 | 378 |
|   | 19 | 43 |   | 67 | 91 | 115 | 139 | 163 | 187 | 211 | 235 | 259 | 283 | 307 | 331 | 355 | 379 |
|   | 20 | 44 |   | 68 | 92 | 116 | 140 | 164 | 188 | 212 | 236 | 260 | 284 | 308 | 332 | 356 | 380 |
|   | 21 | 45 |   | 69 | 93 | 117 | 141 | 165 | 189 | 213 | 237 | 261 | 285 | 309 | 333 | 357 | 381 |
|   | 22 | 46 |   | 70 | 94 | 118 | 142 | 166 | 190 | 214 | 238 | 262 | 286 | 310 | 334 | 358 | 382 |
|   | 23 | 47 |   | 71 | 95 | 119 | 143 | 167 | 191 | 215 | 239 | 263 | 287 | 311 | 335 | 359 | 383 |
|   | 24 | 48 |   | 72 | 96 | 120 | 144 | 168 | 192 | 216 | 240 | 264 | 288 | 312 | 336 | 360 | 384 |

FIG. 5

| 1   | 9   | 5   | 13  | 3   | 11  | 7   | 15  | 2 (90) | 10  | 6   | 14  | 4   | 12  | 8   | 16  |
|-----|-----|-----|-----|-----|-----|-----|-----|--------|-----|-----|-----|-----|-----|-----|-----|
| 65  | 73  | 69  | 77  | 67  | 75  | 71  | 79  | 66     | 74  | 70  | 78  | 68  | 76  | 72  | 80  |
| 129 | 137 | 133 | 141 | 131 | 139 | 135 | 143 | 130    | 138 | 134 | 142 | 132 | 140 | 136 | 144 |
| 193 | 201 | 197 | 205 | 195 | 203 | 199 | 207 | 194    | 202 | 198 | 206 | 196 | 204 | 200 | 208 |
| 257 | 265 | 261 | 269 | 259 | 267 | 263 | 271 | 258    | 266 | 262 | 270 | 260 | 268 | 264 | 272 |
| 321 | 329 | 325 | 333 | 323 | 331 | 327 | 335 | 322    | 330 | 326 | 334 | 324 | 332 | 328 | 336 |
| 33  | 41  | 37  | 45  | 35  | 43  | 39  | 47  | 34     | 42  | 38  | 46  | 36  | 44  | 40  | 48  |
| 97  | 105 | 101 | 109 | 99  | 107 | 103 | 111 | 98     | 106 | 102 | 110 | 100 | 108 | 104 | 112 |
| 161 | 169 | 165 | 173 | 163 | 171 | 167 | 175 | 162    | 170 | 166 | 174 | 164 | 172 | 168 | 176 |
| 225 | 233 | 229 | 237 | 227 | 235 | 231 | 239 | 226    | 234 | 230 | 238 | 228 | 236 | 232 | 240 |
| 289 | 297 | 293 | 301 | 291 | 299 | 295 | 303 | 290    | 298 | 294 | 302 | 292 | 300 | 296 | 304 |
| 353 | 361 | 357 | 365 | 355 | 363 | 359 | 367 | 354    | 362 | 358 | 366 | 356 | 364 | 360 | 368 |
| 17  | 25  | 21  | 29  | 19  | 27  | 23  | 31  | 18     | 26  | 22  | 30  | 20  | 28  | 24  | 32  |
| 81  | 89  | 85  | 93  | 83  | 91  | 87  | 95  | 82     | 90  | 86  | 94  | 84  | 92  | 88  | 96  |
| 145 | 153 | 149 | 157 | 147 | 155 | 151 | 159 | 146    | 154 | 150 | 158 | 148 | 156 | 152 | 160 |
| 209 | 217 | 213 | 221 | 211 | 219 | 215 | 223 | 210    | 218 | 214 | 222 | 212 | 220 | 216 | 224 |
| 273 | 281 | 277 | 285 | 275 | 283 | 279 | 287 | 274    | 282 | 278 | 286 | 276 | 284 | 280 | 288 |
| 337 | 345 | 341 | 349 | 339 | 347 | 343 | 351 | 338    | 346 | 342 | 350 | 340 | 348 | 344 | 352 |
| 49  | 57  | 53  | 61  | 51  | 59  | 55  | 63  | 50     | 58  | 54  | 62  | 52  | 60  | 56  | 64  |
| 113 | 121 | 117 | 125 | 115 | 123 | 119 | 127 | 114    | 122 | 118 | 126 | 116 | 124 | 120 | 128 |
| 177 | 185 | 181 | 189 | 179 | 187 | 183 | 191 | 178    | 186 | 182 | 190 | 180 | 188 | 184 | 192 |
| 241 | 249 | 245 | 253 | 243 | 251 | 247 | 255 | 242    | 250 | 246 | 254 | 244 | 252 | 248 | 256 |
| 205 | 312 | 309 | 317 | 307 | 315 | 311 | 319 | 305    | 314 | 310 | 318 | 308 | 316 | 312 | 320 |
| 369 | 377 | 373 | 381 | 371 | 379 | 375 | 383 | 370    | 378 | 374 | 382 | 372 | 380 | 376 | 384 |

FIG. 6

| | | | | | | | | | | | | | | | |
|---|---|---|---|---|---|---|---|---|---|---|---|---|---|---|---|
| 1 | 17 | 9 | 25 | 5 | 21 | 13 | 29 | 3 | 19 | 11 | 27 | 7 | 23 | 15 | 31 |
| 2 | 18 | 10 | 26 | 6 | 22 | 14 | 30 | 4 | 20 | 12 | 28 | 8 | 24 | 16 | 32 |
| 65 | 81 | 73 | 89 | 69 | 85 | 77 | 93 | 67 | 83 | 75 | 91 | 71 | 87 | 79 | 95 |
| 66 | 82 | 74 | 90 | 70 | 86 | 78 | 94 | 68 | 84 | 76 | 92 | 72 | 88 | 80 | 96 |
| 129 | 145 | 137 | 153 | 133 | 149 | 141 | 157 | 131 | 147 | 139 | 155 | 135 | 151 | 143 | 159 |
| 130 | 146 | 138 | 154 | 134 | 150 | 142 | 158 | 132 | 148 | 140 | 156 | 136 | 152 | 144 | 160 |
| 193 | 209 | 201 | 217 | 197 | 213 | 205 | 221 | 195 | 211 | 203 | 219 | 199 | 215 | 207 | 223 |
| 194 | 210 | 202 | 218 | 198 | 214 | 206 | 222 | 196 | 212 | 204 | 220 | 200 | 216 | 208 | 224 |
| 257 | 273 | 265 | 281 | 261 | 277 | 269 | 285 | 259 | 275 | 267 | 283 | 263 | 279 | 271 | 287 |
| 258 | 274 | 266 | 282 | 262 | 278 | 270 | 286 | 260 | 276 | 268 | 284 | 264 | 280 | 272 | 288 |
| 321 | 337 | 329 | 345 | 325 | 341 | 333 | 349 | 323 | 339 | 331 | 347 | 327 | 343 | 335 | 351 |
| 322 | 338 | 330 | 346 | 326 | 342 | 334 | 350 | 324 | 340 | 332 | 348 | 328 | 344 | 336 | 352 |
| 33 | 49 | 41 | 57 | 37 | 53 | 45 | 61 | 35 | 51 | 43 | 59 | 39 | 55 | 47 | 63 |
| 34 | 50 | 42 | 58 | 38 | 54 | 46 | 62 | 36 | 52 | 44 | 60 | 40 | 56 | 48 | 64 |
| 97 | 113 | 105 | 121 | 101 | 117 | 109 | 125 | 99 | 115 | 107 | 123 | 103 | 119 | 111 | 127 |
| 98 | 114 | 106 | 122 | 102 | 118 | 110 | 126 | 100 | 116 | 108 | 124 | 104 | 120 | 112 | 128 |
| 161 | 177 | 169 | 185 | 165 | 181 | 173 | 189 | 163 | 179 | 171 | 187 | 167 | 183 | 175 | 191 |
| 162 | 178 | 170 | 186 | 166 | 182 | 174 | 190 | 164 | 180 | 172 | 188 | 168 | 184 | 176 | 192 |
| 225 | 241 | 233 | 248 | 229 | 245 | 237 | 253 | 227 | 243 | 235 | 251 | 231 | 247 | 239 | 255 |
| 226 | 242 | 234 | 250 | 230 | 246 | 238 | 254 | 228 | 244 | 236 | 252 | 232 | 248 | 240 | 256 |
| 289 | 305 | 297 | 313 | 293 | 309 | 301 | 317 | 291 | 307 | 299 | 315 | 295 | 311 | 303 | 319 |
| 290 | 306 | 298 | 314 | 294 | 310 | 302 | 318 | 292 | 308 | 300 | 316 | 296 | 312 | 304 | 320 |
| 353 | 369 | 361 | 377 | 357 | 373 | 365 | 381 | 355 | 371 | 363 | 379 | 359 | 375 | 367 | 383 |
| 354 | 370 | 362 | 378 | 358 | 374 | 366 | 382 | 356 | 372 | 364 | 380 | 360 | 376 | 368 | 384 |

| 1 | 9 | 5 | 13 | 3 | 11 | 7 | 15 | 66 | 74 | 70 | 78 | 68 | 76 | 72 | 80 |
|---|---|---|---|---|---|---|---|---|---|---|---|---|---|---|---|
| 65 | 73 | 69 | 77 | 67 | 75 | 71 | 79 | 2 | 10 | 6 | 14 | 4 | 12 | 8 | 16 |
| 129 | 137 | 133 | 141 | 131 | 139 | 135 | 143 | 194 | 202 | 198 | 206 | 196 | 204 | 200 | 208 |
| 193 | 201 | 197 | 205 | 195 | 203 | 199 | 207 | 130 | 138 | 134 | 142 | 132 | 140 | 136 | 144 |
| 257 | 265 | 261 | 269 | 259 | 267 | 263 | 271 | 322 | 330 | 326 | 334 | 324 | 332 | 328 | 336 |
| 321 | 329 | 325 | 333 | 323 | 331 | 327 | 335 | 258 | 266 | 262 | 270 | 260 | 268 | 264 | 272 |
| 33 | 41 | 37 | 45 | 35 | 43 | 39 | 47 | 98 | 106 | 102 | 110 | 100 | 108 | 104 | 112 |
| 97 | 105 | 101 | 109 | 99 | 107 | 103 | 111 | 34 | 42 | 38 | 46 | 36 | 44 | 40 | 48 |
| 161 | 169 | 165 | 173 | 163 | 171 | 167 | 175 | 226 | 234 | 230 | 238 | 228 | 236 | 232 | 240 |
| 225 | 233 | 229 | 237 | 227 | 235 | 231 | 239 | 162 | 170 | 166 | 174 | 164 | 172 | 168 | 176 |
| 289 | 297 | 293 | 301 | 291 | 299 | 295 | 303 | 354 | 362 | 358 | 366 | 356 | 364 | 360 | 368 |
| 353 | 361 | 357 | 365 | 355 | 363 | 359 | 367 | 290 | 298 | 294 | 302 | 292 | 300 | 296 | 304 |
| 17 | 25 | 21 | 29 | 19 | 27 | 23 | 31 | 82 | 90 | 86 | 94 | 84 | 92 | 88 | 96 |
| 81 | 89 | 85 | 93 | 83 | 91 | 87 | 95 | 18 | 26 | 22 | 30 | 20 | 28 | 24 | 32 |
| 145 | 153 | 149 | 157 | 147 | 155 | 151 | 159 | 210 | 218 | 214 | 222 | 212 | 220 | 216 | 224 |
| 209 | 217 | 213 | 221 | 211 | 219 | 215 | 223 | 146 | 154 | 150 | 158 | 148 | 156 | 152 | 160 |
| 273 | 281 | 277 | 285 | 275 | 283 | 279 | 287 | 338 | 346 | 342 | 350 | 340 | 348 | 344 | 352 |
| 337 | 345 | 341 | 349 | 339 | 347 | 343 | 351 | 274 | 282 | 278 | 286 | 276 | 284 | 280 | 288 |
| 49 | 57 | 53 | 61 | 51 | 59 | 55 | 63 | 114 | 122 | 118 | 126 | 116 | 124 | 120 | 128 |
| 113 | 121 | 117 | 125 | 115 | 123 | 119 | 127 | 50 | 58 | 54 | 62 | 52 | 60 | 56 | 64 |
| 177 | 185 | 181 | 189 | 179 | 187 | 183 | 191 | 242 | 250 | 246 | 254 | 244 | 252 | 248 | 256 |
| 241 | 249 | 245 | 253 | 243 | 251 | 247 | 255 | 178 | 186 | 182 | 190 | 180 | 188 | 184 | 192 |
| 305 | 313 | 309 | 317 | 307 | 315 | 311 | 319 | 370 | 378 | 374 | 382 | 372 | 380 | 376 | 384 |
| 369 | 377 | 373 | 381 | 371 | 379 | 375 | 383 | 306 | 314 | 310 | 318 | 308 | 316 | 312 | 320 |

FIG. 10

| | | | | | | | | | | | | | | | |
|---|---|---|---|---|---|---|---|---|---|---|---|---|---|---|---|
| 1 | 17 | 9 | 25 | 5 | 21 | 13 | 29 | 3 | 19 | 11 | 27 | 7 | 23 | 15 | 31 |
| 384 | 368 | 376 | 360 | 380 | 364 | 372 | 356 | 382 | 366 | 374 | 358 | 378 | 362 | 370 | 354 |
| 65 | 81 | 73 | 89 | 69 | 85 | 77 | 93 | 67 | 83 | 75 | 91 | 71 | 87 | 79 | 95 |
| 320 | 304 | 312 | 296 | 316 | 300 | 308 | 292 | 318 | 302 | 310 | 294 | 314 | 298 | 306 | 290 |
| 129 | 145 | 137 | 153 | 133 | 149 | 141 | 157 | 131 | 147 | 139 | 155 | 135 | 151 | 143 | 159 |
| 256 | 240 | 248 | 232 | 252 | 236 | 244 | 228 | 254 | 238 | 246 | 230 | 250 | 234 | 242 | 226 |
| 193 | 209 | 201 | 217 | 197 | 213 | 205 | 221 | 195 | 211 | 203 | 219 | 199 | 215 | 207 | 223 |
| 192 | 176 | 184 | 168 | 188 | 172 | 180 | 164 | 190 | 174 | 182 | 166 | 186 | 170 | 178 | 162 |
| 257 | 273 | 265 | 281 | 261 | 277 | 269 | 285 | 259 | 275 | 267 | 283 | 263 | 279 | 271 | 287 |
| 128 | 112 | 120 | 104 | 124 | 108 | 116 | 100 | 126 | 110 | 118 | 102 | 122 | 106 | 114 | 98 |
| 321 | 337 | 329 | 345 | 325 | 341 | 333 | 349 | 323 | 339 | 331 | 347 | 327 | 343 | 335 | 351 |
| 64 | 48 | 56 | 40 | 60 | 44 | 52 | 36 | 62 | 46 | 54 | 38 | 58 | 42 | 50 | 34 |
| 33 | 49 | 41 | 57 | 37 | 53 | 45 | 61 | 35 | 51 | 43 | 59 | 39 | 55 | 47 | 63 |
| 352 | 336 | 344 | 328 | 348 | 332 | 340 | 324 | 350 | 334 | 342 | 326 | 346 | 330 | 338 | 322 |
| 97 | 113 | 105 | 121 | 101 | 117 | 109 | 125 | 99 | 115 | 107 | 123 | 103 | 119 | 111 | 127 |
| 288 | 272 | 280 | 264 | 284 | 268 | 276 | 260 | 286 | 270 | 278 | 262 | 282 | 266 | 274 | 258 |
| 161 | 177 | 169 | 185 | 165 | 181 | 173 | 189 | 163 | 179 | 171 | 187 | 167 | 183 | 175 | 191 |
| 224 | 208 | 216 | 200 | 220 | 204 | 212 | 196 | 222 | 206 | 214 | 198 | 218 | 202 | 210 | 194 |
| 225 | 241 | 233 | 249 | 229 | 245 | 237 | 253 | 227 | 243 | 235 | 251 | 231 | 247 | 239 | 255 |
| 160 | 144 | 152 | 136 | 156 | 140 | 148 | 132 | 158 | 142 | 150 | 134 | 154 | 138 | 146 | 130 |
| 289 | 305 | 297 | 313 | 293 | 309 | 301 | 317 | 291 | 307 | 299 | 315 | 295 | 311 | 303 | 319 |
| 96 | 80 | 88 | 72 | 92 | 76 | 84 | 68 | 94 | 78 | 86 | 70 | 90 | 74 | 82 | 66 |
| 353 | 369 | 361 | 377 | 357 | 373 | 365 | 381 | 355 | 371 | 363 | 379 | 359 | 375 | 367 | 383 |
| 32 | 16 | 24 | 8 | 28 | 12 | 20 | 4 | 30 | 14 | 22 | 6 | 26 | 10 | 18 | 2 |

INTERLEAVING METHODOLOGY AND APPARATUS FOR CDMA

This application claims priority from U.S. provisional patent application No. 60/103,770 to Chheda et al, entitled "Improved Interleaving Methodology for Orthogonal Transmit Diversity," filed Oct. 9, 1998.

TECHNICAL FIELD

The present invention relates in general to CDMA (Code Division Multiple Access) and in particular to methods and systems for interleaving data in a unique manner before transmission over multiple diversity paths to increase system capacity without compromising reliability of signal reception.

BACKGROUND

CDMA (Code Division Multiple Access) technology, in cellular communication systems, involves the use of different codes to distinguish different user communications rather than different frequencies as commonly used in the initial cellular systems. The codes utilized are referred to as Walsh codes. While the number of codes is finite, the number of simultaneously occurring communications is typically limited by available power, rather than the number of codes available. This is primarily the limitation on capacity and is due to the forward link or downlink—the communication path between base stations (BTS) and mobile station (MS). The reverse link or uplink—communication path between mobile station and base station—capacity is generally limited by interference. However, in deployed CDMA networks, the forward link capacity is the limiting factor in determining number of simultaneous communications that can be served with a given grade of service (GOS). This forward link capacity with respect to a given signal, is primarily a direct function of the magnitude of power required to provide satisfactory reception of all other communication in the vicinity. If all the signals in a cell can be transmitted at a lower power and still be satisfactorily received, there is more available power for new users and thus a potential for increased system communication capacity.

SNR (signal-to-noise ratio) is a term used to express the power of a signal relative to noise (interference). This ratio is generally expressed in dB (decibels) and is a logarithmic function. A common term in CDMA is $E_b/N_o$ (bit energy to total noise power spectral density) and is used to define the strength of the traffic signal received by an MS relative to the noise or interference from other sources. Two principal sources of interference are $I_{oc}$ (total received interference power from cellular communications in adjacent cells) and $I_{or}$ (total received power from cellular communications originating within a cell of interest). A further energy parameter used in the CDMA art is $E_c$ where $E_c$ denotes energy per chip. $E_{c,pilot}$ refers to the pilot channel while $E_{c,traffic}$ refers to the traffic channel. A related but different SNR represented as $E_c/I_{or}$ is used to represent chip energy received from the base station relative to the total received power from a given cell. Therefore, $E_{c,traffic}/I_{or}$ is the percentage of power required for the traffic channel. Another concept in cellular technology is signal diversity. With appropriate equipment, the informational content for a subset of the informational content of a signal may transmitted on more than one frequency, or from one or more antennas, or at different times and so forth to mitigate the effects of signal fading. General information on these forms of diversity can be obtained from any digital communications textbook. The specific names are frequency diversity, spatial diversity, time delay diversity, and so forth. The receiving equipment may utilize the additive combination of the multiple received signals in the detection process. In theory, and usually in practice, fast fading is uncorrelated across the different diversity branches and does not occur on all of the received signals at the same time and thus the receiver typically has enough signal strength to correctly decode the received data. Slow signal fading may occur due to atmospheric conditions but more often, in cellular technology, it is due to interference in the form of physical obstructions between the base station transmitter and a given MS receiver. Hence, transmit diversity may not be able to offer any diversity over the slow fading. Fast fading is due to the way sub paths of signals add constructively and destructively as the MS moves. The sub paths are caused by reflections from objects near the receiver, and are offset in time and phase relative to the other sub paths. The duration of fast signal fading typically is reduced as the movement velocity of the MS increases.

The term transmitter diversity is typically defined as a technique whereby an information sequence is transmitted from more than one diversity branch. This can take the form of multiple frequencies or multiple antennas spaced effectively to mitigate the effects of signal fading. In this document, specifically, we use transmit diversity in the form of spatial diversity (i.e. multiple antennas).

The spatial diversity technique used is to explain the usefulness of the invention. This specific example does not limit the scope of the invention. The invention is also applicable to other forms of transmit diversity, such as frequency diversity—multiple diversity frequency branches—and so forth. These transmissions are designed to ensure independent fading on the different signal paths. Proper combining of the paths at the receiver reduces the severity of the fading. In general, transmit diversity can be subdivided into two main classes, feed-forward diversity schemes and feedback diversity schemes. In feedback methods, measurements made by the mobile and transmitted to the network allow base stations to adjust the transmissions to make optimal use of the different transmission paths. Feedback techniques provide the potential for more performance improvement than feed-forward methods, at the expense of greater complexity.

Several transmit diversity schemes have been considered for inclusion in a new version of CDMA often referred to as cdma2000 or 3G (third generation). The combination of transmit diversity and fast power control is expected to yield a forward link capacity double that of previous IS-95 specification compliant systems. It is important to determine which of the many possible diversity techniques provides the greatest capacity increase at the lowest cost to the overall system design.

The term "interleaving", as used in this document, refers to a communication technique, normally used in conjunction with error correcting codes, to reduce the number of uncorrected bit error bursts. In the interleaving process, code symbols are reordered before transmission. One subset of this definition is that they are reordered in such a manner that any two successive data bits or code symbols are separated by I-1 symbols (or bits) in the transmitted sequence, where I is called the degree of interleaving. Another subset of this definition is that they are reordered such that all originally consecutively occurring bits or symbols are maximally separated. As will be apparent, many other reordering subsets may be generated. The equipment or software for accomplishing this interleaving in a given communication channel is designated as a "channel interleaver".

It is known that the specific design of channel interleavers for transmit diversity schemes may affect system capacity in a cellular system. By system capacity, we mean the total number of MSs that can simultaneously operate in a given cell where the forward link capacity is the limiting capacity factor, and is dependent on the required transmit power per user.

In the cdma2000 proposed standard, a feed-forward transmit diversity scheme is designated as OTD (Orthogonal Transmit Diversity). The originally proposed method of OTD involves encoding and interleaving an information bit stream into a coded bit stream. The streams are then de-multiplexed into two separate streams in a round-robin fashion for transmission over two spatially separated antennas. Each separate stream is then mapped into Quadrature Phase-Shift Keyed (QPSK) symbols and spread by different Walsh codes orthogonal to one another. The spread sequences are then scrambled by a quadrature pseudo-noise (PN) sequence, which is the same from all users of the same sectors. Output streams from each sector are mutually orthogonal, and therefore same-cell interference is eliminated in flat fading channels. By splitting the coded data into two or more data streams, the effective number of spreading codes per user is the same as the case without OTD. Different orthogonal pilots are used and transmitted over the different antennas. This allows coherent detection of the signals received from both antennas.

At the mobile receiver, RAKE fingers demodulate the two parallel paths separately. The matched filter demodulator used is called a RAKE correlator because of the resemblance of the tapped-delay-line matched filter to an ordinary garden rake. That is, the RAKE matched filter/correlator resembles a garden rake in the way it collects the signal energy from all the resolvable multipath components. For more details of the characteristics and performance of a RAKE correlator, reference may be made to Proakis (1989) and to the original works of Price (1954, 1956) and Price & Green (1958).

The two data streams are demodulated using two different sets of Walsh codes. The mobile multiplexes the two paths before de-interleaving and decoding. After the information from each stream is demodulated, the two data streams are multiplexed. The multiplexed stream of soft symbols is used by the mobile to estimate the received $E_b/N_o$, which is in turn used to trigger fast power control commands to the serving base stations. One $E_b/N_o$ estimate is made each power control group, and this estimate is compared to a threshold to determine the value of the power control bit. This is similar to the method used to compute fast reverse link power control commands at the base station in IS-95 networks. Only the power control bits (for reverse link power control) that are punctured onto the forward link data stream are used to compute the $E_b/N_o$ estimates. The power of the traffic channel bits is dependent on the frame sub-rate, and therefore, a priori knowledge of the frame sub-rate is required in order for all traffic channel bits to be used in the $E_b/N_o$ estimates. Therefore, using punctured power control bits, which are always sent at full rate, circumvents this problem.

The prior art interleaving schemes have been found to have serious capacity limitations, at low MS moving velocities and in particular when used with OTD. The capacity limitation at low MS moving velocities is also applicable to the above mentioned OTD as proposed for cdma2000. While the originally occurring consecutive bits were separated in time of transmission, blocks of originally consecutive 16 bits were to be transmitted from the same antenna due to the interleaving methodology utilized. At lower mobile speeds, fading may easily span time comparable to the duration of a frame of data. The loss of such a quantity of consecutively occurring bits prevents the decoder from easily reconstructing the original data; thus increasing the $E_b/N_o$ requirements to meet the given GOS. This limitation is also applicable to other diversity techniques that send a sub-set of information on different diversity branches. Examples of these other techniques include TSTD (Time Switched Transmit Diversity), STD (Selective Transmit Diversity), multi carrier (multiple frequency diversity—where a subset of the data bits are sent on one frequency, and another subset sent on a different frequency) and so forth.

It is desirable to have an interleaving methodology that improves the signal decoding performance of receiving equipment at low MS velocities. It is also desirable that such a methodology provides an improved SNR, since this consequently increases system capacity.

SUMMARY OF THE INVENTION

The present invention comprises an improved interleaving methodology for use with path diversity radio transmissions wherein each path comprises a portion of a communication message.

BRIEF DESCRIPTION OF THE DRAWINGS

For a more complete understanding of the present invention, and its advantages, reference will now be made in the following Detailed Description to the accompanying drawings, in which:

FIG. 4 comprises a set of numbers representing bit positions in a very simple block interleaver table;

FIG. 5 comprises a set of numbers representing bit positions in a bit reversed interleaver table;

DETAILED DESCRIPTION

Figure 1:
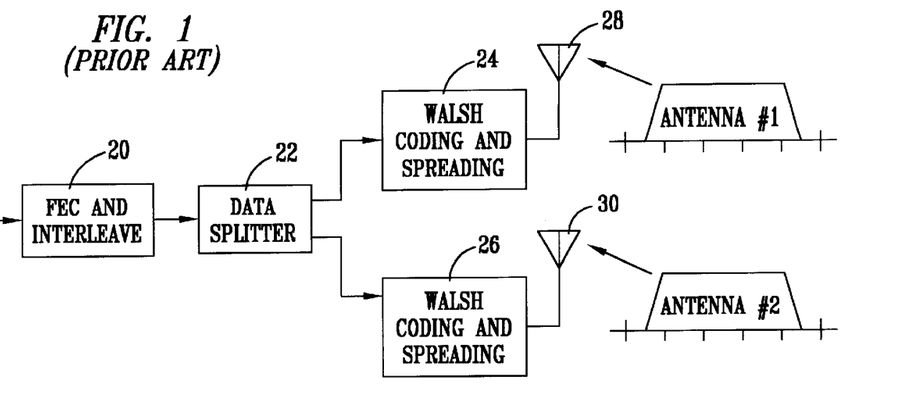
FIG. 1 is a prior art block diagram of a data interleaver and coding portion of a dual path transmitter.

In FIG. 1, a forward error correction (FEC) and interleaver block 20 receives traffic data bits which are processed or combined with error correcting bits to form a new data stream which is passed on to a data splitter 22 where every other bit of a frame of bits is passed to a Walsh coding and spreading block 24. The remaining bits are passed to a similar block 26. As shown, these blocks transfer the resultant signal to antennas 28 and 30 respectively which generate radio signals, in CDMA fashion, having different codes but covering the same bandwidth.

Figure 2:
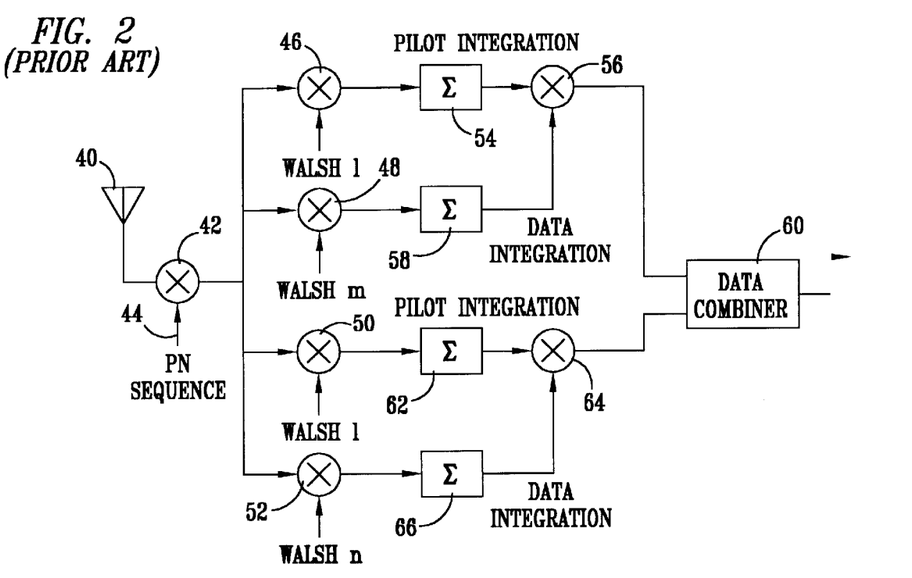
FIG. 2 is a prior art block diagram of a portion of a receiver for combining and decoding the data transmitted by the apparatus of FIG. 1.

In FIG. 2, the signals from both antennas 28 and 30 in FIG. 1 are received at an antenna 40 and input to a combiner or multiplier 42 where it is combined with a PN (Pseudo-Noise—a binary sequence that just looks random) sequence on a lead 44. From combiner 42, it is supplied to four Walsh decoders 46, 48, 50 and 52. These decoders remove their respective components of the combined signal as determined by Walsh codes illustrated as i, m, j and n. A pilot component signal from decoder 46 is integrated in a block 54 before being passed to a multiplier 56. A data signal from combiner 48, representing one of the outputs from data splitter 22 of FIG. 1, is integrated in an integrator 58 before being supplied as a second input to multiplier 56. An output of multiplier 56 is supplied as a first input to a data combiner 60. In a similar manner, a pilot signal, from the other antenna, is passed from combiner 50, through an integrator 62 to a multiplier 64. The second traffic data stream, as obtained from combiner 52, is integrated in a block 66 and supplied as a second input to multiplier 64 and the output of block 64 is provided as a second input to combiner 60. The output of block 60 is directly representative of the input to block 22 of FIG. 1.

Figure 3:
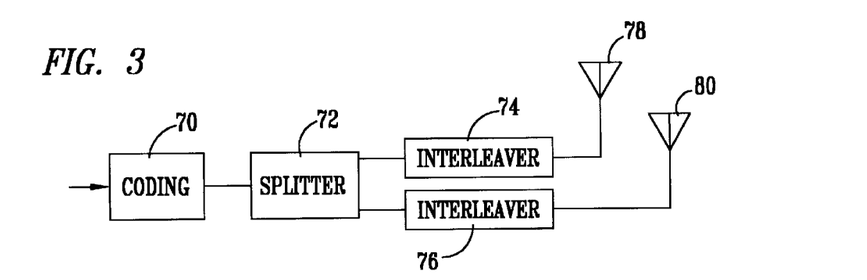
FIG. 3 is a block diagram of one embodiment of a dual path transmitter for practicing the present invention.

In FIG. 3, a coder 70, which perform a function similar to part of block 20 receives the initial traffic. The output of coder 70 is sent to a splitter 72 which is similar to splitter 22. Splitter 72 sends every other data bit to an interleaver block 74 and the remaining bits to a like block 76. An output of block 74 is supplied to an antenna 78. In like manner, an output of block 76 is transmitted from a second antenna 80. By splitting the data before interleaving, the overall computational algorithm is simplified even though this results in two sets of computations. This concept will be explained in more detail in conjunction with later figures.

In the various tables of FIGS. 4–6, 9 and 10, each number represents a bit position in an original string of 384 bits comprising a set. Each of the bits represented is a logic one or a logic zero. In accordance with known error correcting schemes, channel induced errors can be corrected through the use of redundant bits inserted at the transmitting end.

In many instances the signals transmitted from either of the transmitters 28 and 30 are symbols representing 2 or more data bits. Thus, when quadrature phase shift keying is used, each of the four phases may represent one of the logic bit pairs of 00, 01, 10 and 11.

The table of FIG. 4 presents a very simple interleaving example for explanatory purposes. In examining the table of FIG. 4, it may be determined that a first symbol to be transmitted on a first antenna could be the data bits in bit positions 1 and 25. Continuing across the table, the data bits in positions 49 and 73 may be combined to form a symbol for transmission from a second antenna. After the first row is transmitted, the logic bits in positions 2 and 26 would be transmitted from the first antenna. The result is that data bits originally adjacent, prior to interleaving, are separated in time of transmission. The interleaved sequence of bits is transmitted over a fading channel, and re-ordered into its original sequence by the de-interleaver at the receiver. If the interleaver is properly designed, the error correction mechanism is able to reconstruct the original data sequence for lower values of energy per bit to total interference ratio ($E_b/N_o$) than it is when no interleaving is used. This is particularly true when the number of bits corrupted due to a fast fading condition spans a short period in time relative to the time required to transmit all the bits in an interleaving frame, which is the case when the MS velocity is relatively high. Interleaving provides gain in such instances, because bits that are consecutive prior to interleaving are separated from each other by the interleaving process, and therefore do not suffer the same degradation from fading when they are transmitted over a particular radio transmission path. The reason why the performance of the decoding mechanism improves when bit errors are not adjacent can be explained by considering the structure of convolutional codes.

Convolutional codes rely on memory in their encoding schemes. In such codes, each block of k information bits produces a block of n coded bits to be transmitted over the channel. Each n bit block is a function not only of the k information bit block that produced it, but also of previous information bit blocks. A convolutional encoder can therefore be represented by a finite state machine. In IS-95 and cdma2000, k is typically 1, while n may be 2, 3 or 4. The convolutional coder comprises a shift register with kL stages, where L is called the constraint length of the code. In IS-95 and cdma2000, L is typically 9. Therefore, the n encoder outputs depend on the most recent k input bits, and also on the previous (L−1)k contents of the shift register before the k bits arrived.

A decoder of a convolutional code exploits the memory introduced by the encoder to correct errors caused by signal fading during transmission. Each coded bit is a function of many of the surrounding bits, so when an isolated error occurs due to signal fading, the decoder uses knowledge of the most likely sequence of bits to correct the error. However, when many successive coded bits are in error, knowledge of the overall bit sequence is lost, and the original data sequence is difficult to recover. Signal fading typically causes channel errors which occur in bursts, but the interleaver functions to break up these bursts into isolated bit errors, which are easier for the decoder to correct.

If the mobile station velocity is relatively slow, then the fast fading may span several significant fractions of the frame or even several frames. In such a situation, interleaving by itself provides little gain, but the fast power control process provides a benefit. Consider the case in which two antennas are used for diversity and consecutive bits prior to interleaving are not sent out of different antennas. In this case, even if the bits are separated in time, then they would still be lost at low MS speeds if the particular antenna path over which they are transmitted undergoes a long fade.

A second interleaving scheme, used in the prior art, implements the maximum time of transmission distance between originally consecutive bit positions of a set of data. Thus in FIG. 5, the bits in positions 1 and 65 may be sent from the first antenna. Going vertically down the column, bits 129 and 193 may be combined to form a symbol transmitted from the second antenna. When all the bits of that column have been transmitted, the bits in positions 9 and 73 are transmitted on the first antenna and so forth. It may be noted that the time distance between adjacent bit positions 1 and 2 are ½ the set apart in transmission time. The same holds true for bit positions 3 and 4. This interleaving algorithm is thus intended to provide maximum distance in transmission times between all originally adjacent bits in a set of bits. It should be noted however that blocks of 16 consecutive bits, for instance bits 1–16, are transmitted from the same antenna. This also happens, even if the bits are split in a round robin fashion (splitter 22 of FIG. 1), such that bit 1 goes to spreading block 24, and bit 65 goes to spreading block 26, and so forth. In this case blocks of consecutive bits, for instance bits 1–16, would still be transmitted from the same antenna. Thus a problem may arise if a long duration fade occurs with respect to one of the antennas such as the first one mentioned. If this fade exceeds a period beyond the time it takes to transmit more than ½ the set of bits there exists the potential of many instances of consecutive bits being incorrectly decoded. A review of the first two lines will illustrate that, if a fade extends from the time bit position 1 is transmitted to past the time bit position 2 is transmitted, consecutive bits 1–3 and 65–67 (included in 3 common symbols) may well be incorrectly decoded. A similar circumstance applies to all the bits in the columns below bit positions 1, 3 and 2. If the fade extends past the time of transmission of bit position 10, another set of three consecutive bit positions such as 9, 10 and 11 may well be affected.

As stated above, blocks of sixteen consecutive bits are transmitted on the same antenna when the interleaving scheme of FIG. 5 is used. Although adjacent bits prior to interleaving are separated in time, at lower mobile speeds, the fading may span the duration of a frame or a time comparable to the duration of the frame. Therefore, if the signal from one of the two antennas is in a deep fade, a long sequence of bits with a low signal-to-noise ratio will be passed to the decoder. Frames of this kind are very difficult to decode. When OTD is not implemented, and fading is slow, fast power control (as will be used in 3G systems) is very effective in ensuring that the signal-to-noise ratio at the receiver is adequate. However, the interaction of OTD and fast power control is not straightforward, and the resulting power control process is not as efficient in a non-OTD situation. The comments below apply more or less equally to fast forward and fast reverse power control systems.

In the fast power control process, the $E_b/N_o$ estimate made for power control purposes is based on the punctured power control bits that are sent on different antennas (different OTD paths). Consequently, the $E_b/N_o$ estimate is based on an average across both paths. This is where the problem arises. At low Doppler, if one OTD path suffers a long fade, the $E_b/N_o$ estimate may not adequately represent this, especially if the other path is strong (which is not un-likely if the fading of the two paths is independent). In such cases, the mobile station may not request an increase in forward link-power, even if it requires one to successfully decode a frame. If the frame is in error, the $E_b/N_o$ target used for power control increases, based on the power control algorithm, to meet the FER target. This produces an increase in forward link traffic channel transmit power in order to meet the $E_b/N_o$ target, and the performance is therefore degraded.

The above explanations of interleaving and data splitting utilized the prior art structure of FIG. 1 where error correcting procedures and interleaving occurs in block 20 and the data is split between the two antennas 28 and 30 in subsequent block 22. In FIG. 5, a vertical line 90 divides the set of data into two subsets. Such division may be accomplished in splitter 72 of FIG. 3. The interleavers 74 and 76 may then individually rearrange the data bits to appropriate positions to provide separation of time of bit transmission or use the current format as is where each interleaver produces the pattern on one side or the other of demarcation line 90. An inspection of FIG. 5 for either side of a line 90 will reveal that no two originally consecutive bits occur. Thus the problem of a long fade for either one of antennas 78 or 80 will not result in the loss of originally occurring consecutive bits.

Figure 6:
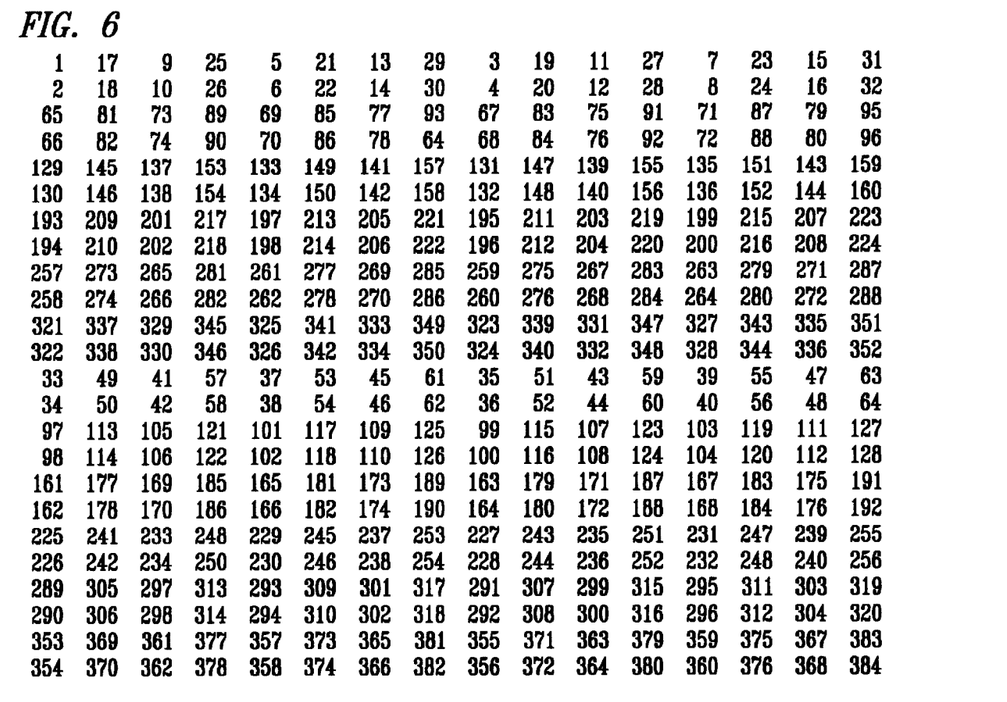
FIG. 6 comprises a set of numbers representing bit positions in an improved version of FIG. 5.

The data bits of FIG. 5 may be redistributed into the format of FIG. 6. In this configuration, as the bits are read from top to bottom of each column, and the columns read from left to right, the splitter 72 alternates the bits into interleavers 74 and 76. That is, bit 1 goes to interleaver 74, bit 2 is supplied to interleaver 76, bit 65 is supplied to interleaver 74 and so forth. Then bits 1, 65, 129 (alternate or odd index position bits) may be interleaved with a structure similar to that in FIG. 5 on one side of demarcation line 90 or any other chosen fashion. With this approach, no two consecutive bits (prior to interleaving) are ever transmitted on the same antenna.

Figure 7:
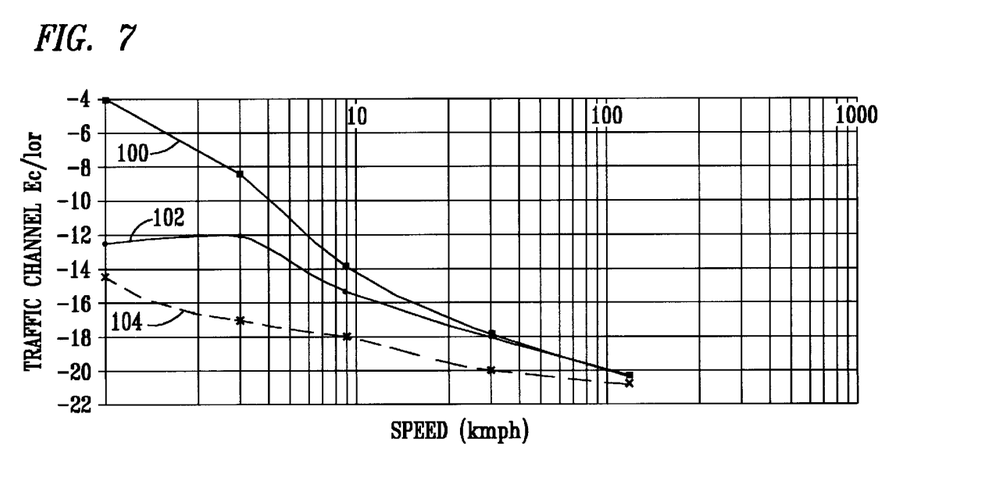
FIG. 7 is a graph depicting traffic channel $E_c/I_{or}$ versus speed under single multipath per sector conditions using interleaver schemes of FIGS. 5 and 6.

In FIG. 7, an intermediate graph line 102 represents the traffic channel $E_c/I_{or}$ for a baseline situation under single multipath per sector conditions, where only fast forward power control (non OTD case) is used and a standard interleaver design, such as shown in FIG. 5 without demarcation line 90, is used. $E_c/I_{or}$ represents the transmit power required to satisfactorily receive the signal a given distance for a given grade of service criteria. As the average transmit power required to complete a communication in a system is lowered, there is more available power for the system to assign to additional users which may be equated to providing an increase in capacity. Thus lower (a larger negative dB number) $E_c/I_{or}$ is a desirable quality. A graph line 100, representing one channel of an OTD system using the bit reversed prior art interleaver of FIG. 5 in the configuration of FIG. 1 shows degradation at lower velocity of an MS as compared to the baseline 100. However, an improvement is shown on a line 104 using either the two halves or subset of FIG. 5 in conjunction with FIG. 3 or the interleaver of FIG. 6 with the prior art transmitter of FIG. 1.

In FIG. 8, a graph line 110 again represents a two multipath (equal gain or power per multipath) per sector condition prior art system using standard interleaver design as a baseline. As above, a line 108 represents the SNR or $E_c/I_{or}$ for both paths of a prior art OTD and a line 112 shows the values for the improved interleaver design of FIG. 6 (or the modified dual interleaver version of FIG. 5).

Figure 8:
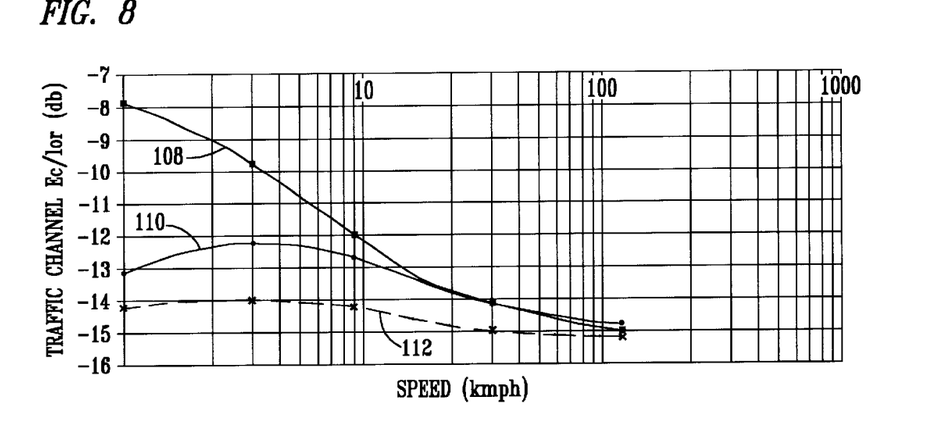
FIG. 8 is a graph depicting traffic channel $E_c/I_{or}$ versus speed under two multipath (equal gain or power per path) per sector conditions using the interleaver schemes of FIGS. 5 and 6.

In these sets of data presented in FIGS. 7 and 8, the fading across both antennas is independent, in other words "not correlated". It is shown from the graphs that for velocities lower than about 10 kmph, the performance of OTD, using the prior art interleaver of FIG. 5, is significantly poorer than the reference with the interleaver approach of FIG. 6 or 5 as modified.

It is thus apparent that, if consecutive bits prior to interleaving are lost, then the information bit is also lost, unless the SNR per bit is increased, and it is difficult for the decoder to decode the frame correctly. With the interleaver design of FIG. 6 (or a dual interleaver utilization of FIG. 5 in combination with FIG. 3), this effect at low Doppler is mitigated since originally consecutive bits are always sent on different antennas. If the fading is independent across both OTD paths, then this is sufficient. At higher Doppler, the fades are much faster compared to the duration of the fades, hence the importance of separating consecutive bits onto different OTD paths is less, and the degradation reduces. Under single multipath conditions the transmit power requirements are higher at 1 kmph mobile velocities than 3 kmph mobile velocities, which is contrary to the typical (baseline) case in which required power decreases at very low mobile speeds (causing a characteristic hump in the performance curve). Under the two multipath conditions the situation is reversed, and a hump is just noticeable.

The above graphs represent conditions where the fading on one transmission path has no correlation with any fading on the other path. If the fading on one path occurs at the same time in an identical amount, the fading is termed to be 100% correlated.

It may be noted that correlated fading impairs the performance of OTD as described above, because even if adjacent bits are transmitted on different antennas, they will both be received with inadequate signal energy if they are transmitted close together in time and both diversity paths undergo a fade together. It is thus believed that an interleaver designed to reduce the degradation caused by correlated fading would be beneficial even if more computational power is required to implement this.

In the following discussion, for simplification in presentation, only one of the bits for a symbol is mentioned. In the prior art interleaver of FIG. 9, bit 1 is transmitted on the first antenna, and bit 65 is transmitted on the second antenna, and so on. At the halfway point of the interleaver, the bits are switched, hence bit 66 is transmitted on the first antenna, and bit 2 on the second. Therefore, adjacent bits are transmitted on different antennas, and time shifted by half the number of bits in the frame. The time shift between alternate bits is however less than the previously described FIG. 6.

Figure 10:
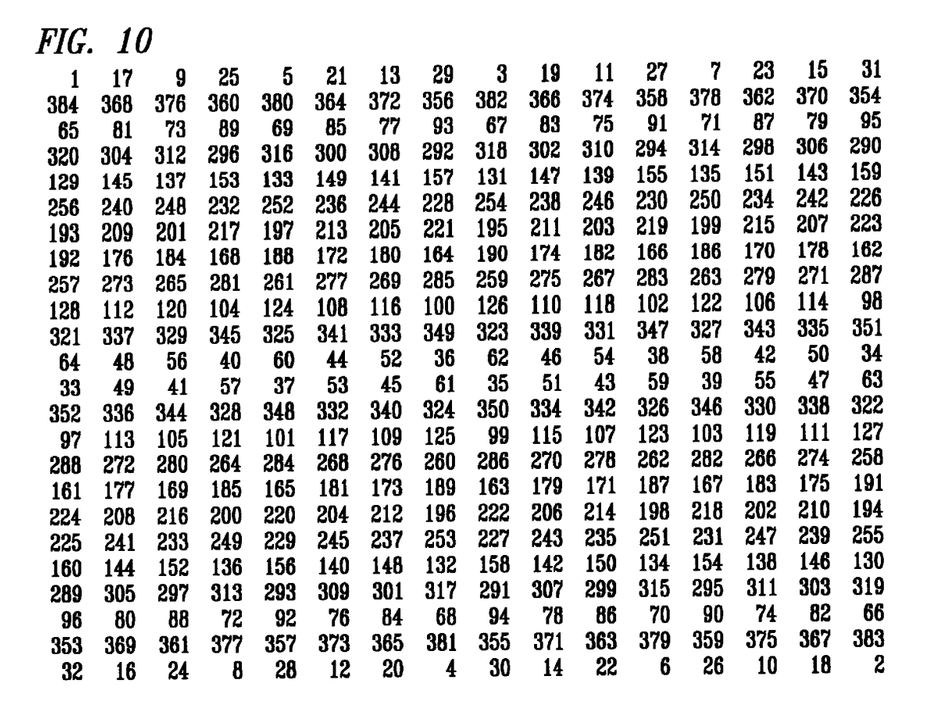
FIG. 10 comprises an alternate a set of numbers representing bit positions in a cyclic shift interleaver table designed to compensate for correlated fading.

A modified version of the interleaver in FIG. 6 is presented in FIG. 10. This interleaver is designed to separate coded bits in time which are produced by the same information bit. FIG. 10 presents another potential interleaver configuration which can be utilized to cope with both correlated and uncorrelated fading while still providing good performance in low velocity MS situations.

The interleaver in FIG. 6 is easier to implement than the interleaver shown in FIG. 10. The reason for this is the constant time shift between consecutive bits in FIG. 6. In the interleaver shown in FIG. 10, the time shift across both diversity paths starts out at a maximum for bits 1 and 2, and converges to a minimum for bits 36 and 35. However, the interleaver in FIG. 10 provides greater interleaving depth between alternate bits, such as bits 1 and 3 and so on, than does the prior art interleaver in FIG. 9.

Figure 11:
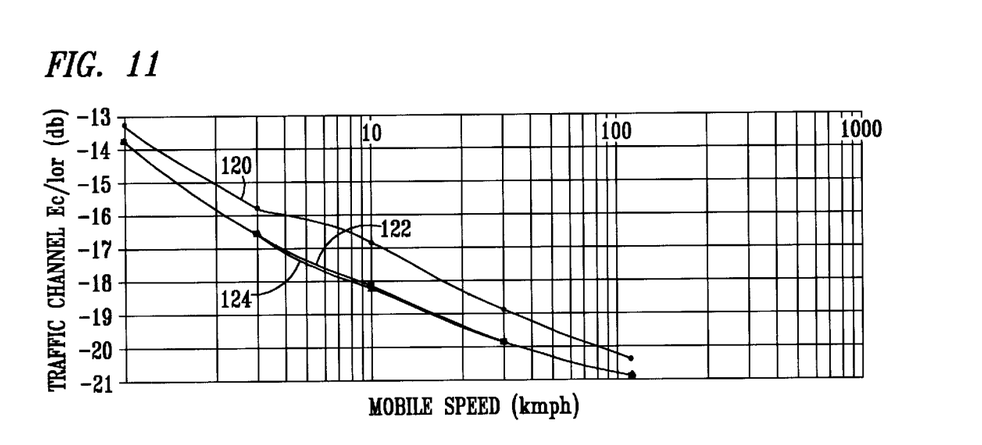
FIG. 11 is a graph depicting traffic channel $E_c/I_{or}$ versus speed for different interleavers under uncorrelated fading conditions and under single multipath per sector conditions.
Figure 12:
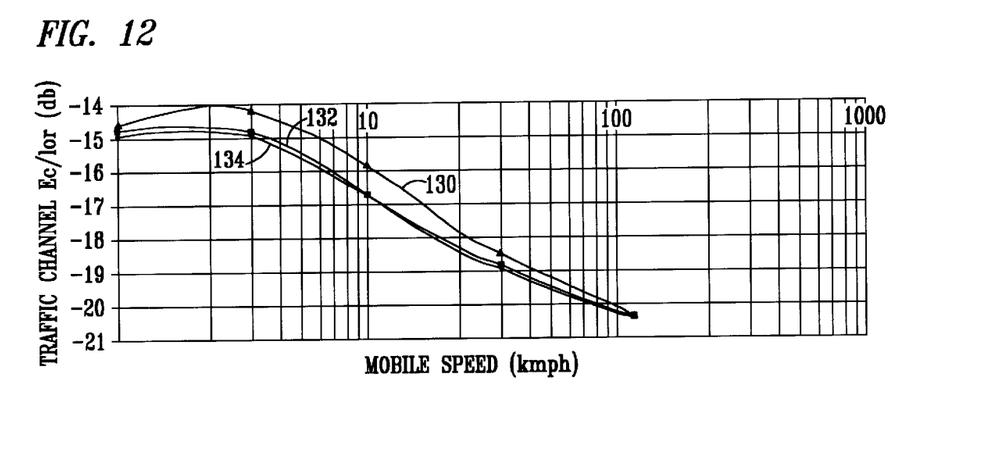
FIG. 12 is a graph depicting traffic channel $E_c/I_{or}$ versus speed for different interleavers under 75% correlated fading conditions and under single multipath per sector conditions.

The set of graphs in FIG. 11 depict the performance of different interleavers under uncorrelated fading conditions. A line 120 represents the results using the interleaver of FIG. 9. A line 122 represents the results of FIG. 6 while line 124 represents the results of using the interleaver of FIG. 10. It may be noted that line 104 in FIG. 7 and line 122 of FIG. 11 are essentially the same when presented under the same graph parameters. In FIG. 12 the traffic channel $E_c/I_{or}$ is presented for the same set of interleavers as used in FIG. 11 but with 75% correlated fading conditions. A line 130 represents the results of using the interleaver of FIG. 9 while lines 132 and 134 represent the results of using the interleavers of FIGS. 6 and 10 respectively.

Figure 13:
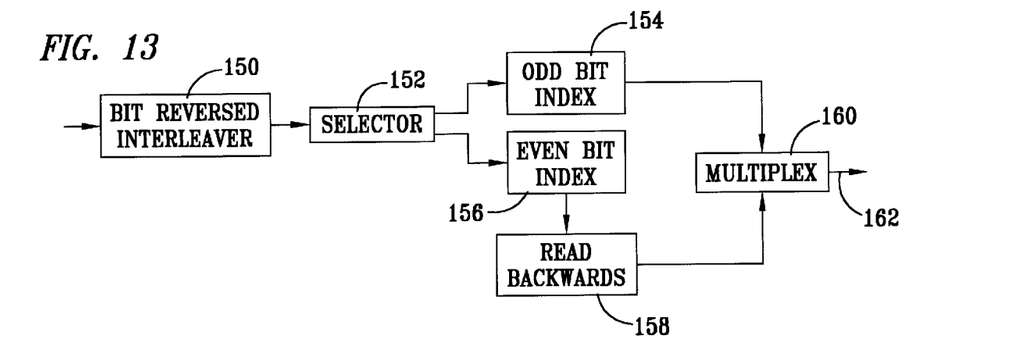
FIG. 13 illustrates circuitry that may be used to implement the interleaved format of FIG. 10 starting with the pattern or format of FIG. 6.

In FIG. 13, a bit reversed interleaver block 150 may be used to generate a bit index of the type shown in FIG. 6. The output of block 150 is passed through a splitter or selector 152 whereby the alternate bit index indications are sent to an odd bit index block 154 and the remaining bit index indications are sent to an even bit index block 156. When the blocks 154 and 156 are filled, the indications of block 156 may be read backwards by a read backwards block 158 to a multiplex block 160 which combines bit index indications from both blocks 154 and 158 into a serial output stream 162. Thus the circuitry of FIG. 13 may be used to replace block 20 in FIG. 1 in practicing the improved interleaver format of FIG. 10.

An examination of FIGS. 5, 6, 10 and 13 will now be made. If the output of a bit reversed interleaver such as used to produce the matrix of FIG. 6 is split or the index is alternately selected going down the matrix columns of FIG. 6, the even bit indicia will end up in block 156 and the remaining indicia will end up in block 154. This is the same result as shown on the two sides of demarcation line 90 in connection with FIG. 5. The first bit of FIG. 5 is "1" and the last even bit on the right hand side of FIG. 5 is 384. Thus these two bits are multiplexed to occur consecutively on line 162 and as shown in FIG. 10. Going down the column of FIG. 10, it will be noted that this index number is for bit 65 and this corresponds to the second bit on the left hand side of FIG. 5 and the $3^{rd}$ bit position of FIG. 6. The next to the last bit index on the right hand side of FIG. 5 (this corresponds to the next to the last even bit index of FIG. 6) is "320". This is the indicia placed in the fourth position of the matrix of FIG. 10.

From the above it may be determined that, starting with a bit interleaver that produces either a divided matrix like that of FIG. 5 or separating the indicia of FIG. 6 into odd and even bit index positions, will provide 2 sets of index indicia as may be found in blocks 154 and 156. If one of these sets is read backwards as it is being combined with the other, the effect will be in the format of the matrix of FIG. 10 for two paths. When more than two paths, the first indicia access point of the intermediate sets needs to be shifted to a determinable point between beginning and end to produce a matrix having a result similar to that obtained by FIG. 10. Thus if there were 4 paths, each set of 4 bits would be placed in different index blocks after splitting or selecting. The combining of data bits from these blocks would start from the first position of one block going forward, from ½ way down the set of indicia in the second block going forward, from the last position of a third block proceeding backward and from ½ way up the remaining block proceeding backward from the end.

Another way of explaining the manner in which the matrix of FIG. 10 is generated is to define the matrix of FIG. 5 as a frame. Thus for a two path diversity, each side of the demarcation line 90 may be termed a ½ frame. The multiplexer 160 may then be said to be combining in a manner of counting forward in the index of bits for one frame and counting backwards for the index of the other frame (right hand side). For L paths, there would be L frame portions each containing 1/L bits indicia. The recombiner or multiplexer corresponding to block 160 would use a process equivalent to retrieving bits from all the frame portions by counting forward from the beginning in one frame portion, backwards from the end in a second frame portion. It would then as evenly as possible divide the remaining frame portions as to starting points between beginning and end of a frame portion for commencing retrieval of bit indicia and the process of counting forward toward the end or backward toward the beginning of the frame portion.

Figure 9:
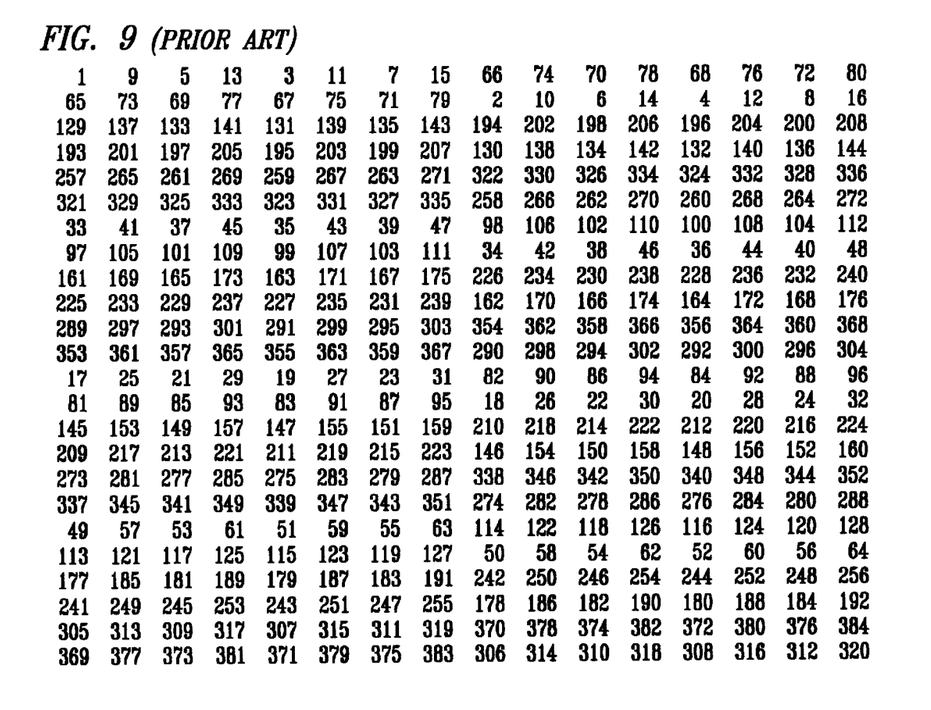
FIG. 9 comprises a set of numbers representing bit positions in a prior art bit reversed interleaver table that was supposedly designed to compensate for correlated fading.

From the results presented supra, it is shown that under uncorrelated fading conditions across the two antennas (ideal), the prior art (designated as "Bit-Twist") interleaver of FIG. 9 does not perform as well as the other two interleavers of FIGS. 6 and 10. At lower mobile velocities, the power control is effective and the difference in performance is on the order of 0.4 dB, at high mobile velocities, this difference is a little higher at about 0.5 dB. However, at medium velocities (about 10 kmph) the difference in performance is about 1.5 dB. At this speed, the power control is not as effective, hence, the interleaving depth is key in grading the performance. As the correlation between the antennas increases, the performance degradation narrows. But the interleaving depth is still an issue.

We have shown specific interleaver designs that provide improved performance over prior art approaches at low velocity for an MS encountering fading conditions. The improvement occurs over a range from uncorrelated to correlated fading conditions for a pair of paths as used in OTD implementations. The criteria for design comprises making sure adjacent bits out of the convolutional coder and prior to interleaving are transmitted from different antennas and interleaved for maximally separating the time of transmission of alternate bits in a set of originally consecutive bits where two paths are involved. The concept of this invention may however be applied to any number of paths whether multiple diversity frequencies, multiple diversity antennas or some other suitable mechanism are used to send different sub-sets of the information.

In the following, L is used to refer to the number of paths for designing an interleaver to be used with the transmitter configuration of FIG. 3 having a plurality of interleavers where an original set of data is split into two or more subsets before interleaving each subset. First each path is assumed to be transmitting symbols or bits at an equal rate where R is the rate in bits/sec and the data is transmitted in frames of duration T seconds. The number of bits transmitted per frame is N=RT bits.

In order to be able to design an interleaver that may be used to interleave each of the L de-multiplexed paths, the number of bits per frame, N, must be an integer multiple of the number of paths, L. If this requirement holds, the size of each of the smaller interleavers (such as 74) is N/L. In order for the smaller interleaver to be rectangular in form with m rows and n columns, and in order for the interleaving to be non-trivial, the quantity N/L should not be a prime number. Further, each of any set of L originally consecutive bits, prior to interleaving, must be transmitted over L separate paths. Such transmission over L paths may be provided using a plurality of interleavers or a single appropriately designed interleaver. Also, consideration in the design must be taken to ensure that if there are L interleavers, then the separation between bit X and bit L+X which are transmitted on the same path are separated by a large amount. That is, if bit X is transmitted on path 1 and bit X+1 is transmitted on path 2 and so on, till bit X+L−1 is transmitted on path L, then bit X+L would be transmitted on path 1 again. Therefore, separating bit X and X+L in time will improve the performance of the system in terms of increased capacity.

Once the above conditions are met and it is desired to use multiple interleavers, the interleaver to be used on each of the L paths can be designed in a way that gives the best performance for the conditions involved. For example, this could be a bit-reversed interleaver, as is presently used in IS-95A compliant systems, or a classical rectangular m×n interleaver.

The design of an interleaver 20 such as used for FIGS. 6 and 10 with the hardware of FIG. 1 uses a less straightforward algorithm. In this embodiment of the invention, the original information stream, after interleaving, is de-multiplexed into L paths, where each of the de-multiplexed streams are identical to those that would be generated by the process of de-multiplexing first, and then interleaving using a smaller interleaver. In order for the two methods to be equivalent, the larger interleaver must be designed in a particular way as described below.

An interleaver of size N may be described as using a read-out pattern, $\{a_1, a_2, \ldots a_N\}$. Each number $a_i$ in the read-out pattern represents a different interleaver input bit. For example, if $a_5=12$, then for each frame, the fifth bit output from the interleaver is the twelfth input bit to the interleaver. In IS-95A, the forward link interleaver is described in this way, but the elements of the read-out pattern are represented in matrix form, with 24 rows and 16 columns. The read-out pattern is read column-wise in IS-95A. That is, the elements of the first column, from top to bottom, are $a_1, a_2, \ldots, a_{24}$. The elements of the second column are $a_{25}, a_{26}, \ldots, a_{48}$. The other columns follow a similar pattern.

The read-out pattern of the interleaver 20 is created the following way. It may be assumed that an equivalent interleaver 74 is of size N/L. Then a read-out pattern with L times as many elements must be formed, according to the following pattern:

$La_1-L+1, La_1-L+2, \ldots, La_1, La_2-L+1, \ldots, La_2, \ldots,$
$La_{N/L}-L+1, \ldots, La_{N/L}$.

Such a read-out pattern can be represented in a matrix with the same number of columns and L times as many rows as in the matrix representation of the equivalent interleaver 74.

For example, if the read-out pattern of an equivalent interleaver 74 is 1, 33, 65, . . . 192 and L=2, then the new read-out pattern is 1, 2, 65, 66, 129, 130, . . . , 383, 384.

Following such an approach, any number of paths can be accommodated using a single interleaver 20 while practicing the teachings of the present invention.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It is therefore, contemplated that the claims will cover any such modifications or embodiments that fall within the true scope and spirit of the invention.

What is claimed is:

1. A method of transmitting data comprising the steps of:
    separating a set of consecutively occurring data bits into a plurality of subsets N where each subset includes only data bits of the original set separated by the value of N;
    interleaving the data bits of each subset; and
    transmitting each of said N subsets of data on a different path.

2. The method of claim 1 where the separation of data bits within each subset is such that the time between occurrence of transmission of original set bits spaced N bits apart is maximized.

3. A method for transmitting data, the data being transmitted over a predetermined number of paths L, the method comprising the steps of:
    modulating the data to be transmitted; and
    transmitting the modulated data over the L paths such that each individual bit of L consecutive bits, prior to interleaving, is transmitted over a different one of said L paths.

4. The method of claim 3 comprising the additional step of:

maximizing the time of transmission, in a given path, between bits which were situated L bits apart in the original set of data to be transmitted.

5. A method for interleaving data to be transmitted in a radio environment, the data being transmitted over a predetermined number of paths in the radio environment, the method comprising the steps of:

splitting the data to be transmitted into the predetermined number of paths;

interleaving the data in each path of the predetermined number of paths; and transmitting the interleaved data through the predetermined number of radio paths.

6. The method of claim 5 wherein each path of the predetermined number of paths comprises a different frequency.

7. The method of claim 5 wherein each path of the predetermined number of paths comprises a different antenna.

8. The method of claim 5 wherein each path of the predetermined number of paths is a diversity path.

9. The method of claim 5 wherein each path of the predetermined number of paths comprises a different code.

10. A method for interleaving data bits of an original set of consecutively occurring data bits to be transmitted in a radio environment, the data being transmitted over a predetermined number of paths L in the radio environment, the method comprising the steps of:

splitting the data to be transmitted into the predetermined number of paths;

interleaving the data in each path of the L paths whereby each individual bit of L data bits occurring consecutively in the original set of data bits is transmitted over a different one of said L paths; and transmitting the L paths of data.

11. A method of diversity transmitting subsets of data from an original set of consecutively occurring data bits comprising the steps of:

splitting the original set of data into a predetermined number N of subsets of data where each subset includes only data bits of the original set separated by the value of N;

interleaving the data in each subset; and transmitting each subset of data over N paths, the interleaving step maximizing the transmission time difference of at least one of, a) originally occurring consecutive bits in each of the N paths, and b) bits originally separated by N bits and transmitted over a given path.

12. A signal path diversity interleaving methodology comprising the steps of:

splitting a set of data to be transmitted into a plurality of subsets N;

interleaving each of the subsets N, wherein the interleaving of each subset maximizes the time differential of transmission of originally consecutive bits in the set of data to be transmitted; and transmitting each subset over a different path.

13. Data transmitting apparatus comprising:

data source providing an original set of consecutively occurring data bits;

data separating means, connected to said data source, for creating a plurality of data subsets N where each subset includes only data bits of the original set separated by the value of N and further each subset of data bits is interleaved to separate data bits originally N bits apart as provided by said data source; and transmission means for transmitting each of said N subsets of data on different paths.

14. Apparatus as claimed in claim 13 wherein said data separating means comprises:

interleaving means; and data splitter means.

15. Apparatus as claimed in claim 13 wherein:

data splitter means, within said data separating means, separates the data into N subsets; and N interleaving means within said data separating means operates to interleave the data bits to be transmitted over each path.

16. Apparatus as claimed in claim 13 wherein:

an interleaver within said data separating means, interleaves the received data into N interleaved subsets; and splitting means, within said data separating means, separates the interleaved data for transmission onto said N paths.

* * * * *